US012807015B2

(12) United States Patent
Venkatesan et al.

(10) Patent No.: US 12,807,015 B2
(45) Date of Patent: Nov. 24, 2026

(54) CHARGING INLET ASSEMBLY OF A VEHICLE

(71) Applicant: TE Connectivity Solutions GmbH, Schaffhausen (CH)

(72) Inventors: Ram Kishore Venkatesan, Winston Salem, NC (US); Kevin John Peterson, Kernersville, NC (US); Aaron James de Chazal, Rochester, MI (US); Clara Marguerite Rhodes, Winston Salem, NC (US)

(73) Assignee: TE Connectivity Solutions GmbH (CH)

( * ) Notice: Subject to any disclaimer, the term of this patent is extended or adjusted under 35 U.S.C. 154(b) by 389 days.

(21) Appl. No.: 18/633,643

(22) Filed: Apr. 12, 2024

(65) Prior Publication Data

US 2024/0351457 A1 Oct. 24, 2024

Related U.S. Application Data

(60) Provisional application No. 63/460,503, filed on Apr. 19, 2023.

(51) Int. Cl.

| | |
|---|---|
| ***B60L 53/16*** | (2019.01) |
| ***H01R 4/34*** | (2006.01) |
| ***H01R 13/42*** | (2006.01) |
| ***H01R 13/73*** | (2006.01) |

(52) U.S. Cl.

CPC ................ *B60L 53/16* (2019.02); *H01R 4/34* (2013.01); *H01R 13/42* (2013.01); *H01R 13/73* (2013.01)

(58) Field of Classification Search

CPC ................................. B60L 53/16; H01R 4/34

USPC ............................................ 439/34; 320/109

See application file for complete search history.

(56) References Cited

U.S. PATENT DOCUMENTS

| | | | | |
|---|---|---|---|---|
| 5,545,046 | A * | 8/1996 | Masuda | B60L 53/31 439/142 |
| 7,491,065 | B2 * | 2/2009 | Wagner | H01R 13/5213 439/35 |
| 9,463,702 | B2 * | 10/2016 | Fukushima | H01R 13/567 |
| 10,243,398 | B2 * | 3/2019 | Schuster | G05B 19/05 |
| 11,362,460 | B2 * | 6/2022 | Kitagawa | H01R 13/562 |
| 11,626,682 | B2 * | 4/2023 | Yamaguchi | H01R 13/405 439/736 |
| 2020/0099157 | A1 * | 3/2020 | Arai | B60L 53/16 |

* cited by examiner

*Primary Examiner* — Phuong K Dinh

(57) ABSTRACT

A DC terminal module for a charging inlet assembly of an electric vehicle includes a housing having a housing base mounted to a charging inlet housing. The housing includes a cable mount at a bottom that receives a DC cable assembly from the bottom. The DC terminal module includes a DC terminal assembly received in a terminal chamber with a pin terminal extending into a receptacle of the charging inlet assembly for mating with the charging connector. The DC terminal assembly includes a terminal busbar extending from the pin terminal to the cable mount at the bottom of the DC housing for electrical connection to the DC cable assembly at the bottom of the DC housing.

20 Claims, 4 Drawing Sheets

CHARGING INLET ASSEMBLY OF A VEHICLE

CROSS REFERENCE TO RELATED APPLICATIONS

This application claims the benefit of U.S. Provisional Application No. 63/460,503 filed 19 Apr. 2023, the subject matter of which is herein incorporated by reference in its entirety.

BACKGROUND OF THE INVENTION

The subject matter herein relates generally to vehicle charging systems.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The inlet housing is coupled to the vehicle. Cable harnesses are coupled to the AC terminals and the DC terminals and extend to other system components, such as the battery. The AC terminals and the DC terminals are coupled to the rear of the housing and power cables extend from the AC terminals and the DC terminals to the battery or other system component. However, servicing of the charging inlet assembly and the terminals and cable harness is difficult. Service typically involves disassembly and removal of the charging inlet assembly from the vehicle for service to access the terminal assemblies and the cable harnesses, which is time consuming.

A need remains for an improved charging inlet assembly.

BRIEF DESCRIPTION OF THE INVENTION

In one embodiment, a DC terminal module for a charging inlet assembly of an electric vehicle configured to receive a charging connector to charge the electric vehicle is provided. The DC terminal module includes a DC housing extending between a front and a rear. The DC housing has a top and a bottom. The DC housing has a housing base at the front configured to be mounted to a charging inlet housing of the charging inlet assembly. The DC housing includes walls forming a terminal chamber. The DC housing includes a cable mount at the bottom configured to receive a DC cable assembly from the bottom of the DC housing. The cable mount includes an opening at the bottom is open to the terminal chamber to receive the DC cable assembly. The DC terminal module includes a DC terminal assembly received in the terminal chamber. The DC terminal assembly includes a pin terminal configured to extend from the front of the DC housing into a receptacle of the charging inlet assembly for mating with the charging connector. The DC terminal assembly includes a terminal busbar extending from the pin terminal to the cable mount at the bottom of the DC housing for electrical connection to the DC cable assembly through the opening at the bottom of the DC housing.

In another embodiment, a charging inlet assembly for an electric vehicle is provided and includes a charging inlet housing that has a housing front and a housing rear. The charging inlet housing has a charging receptacle at the housing front configured to receive a charging connector. The charging inlet housing includes terminal channels at the charging receptacle extending between the housing front and the housing rear. The charging inlet assembly includes a DC terminal module coupled to the charging inlet housing at the housing rear. The DC terminal module includes a DC housing holding a DC terminal assembly. The DC housing extends between a front and a rear. The DC housing has a top and a bottom. The DC housing has a housing base at the front coupled to the housing rear of the charging inlet housing. The DC housing includes walls forming a terminal chamber. The DC housing includes a cable mount at the bottom configured to receive a DC cable assembly from the bottom of the DC housing. The cable mount includes an opening at the bottom is open to the terminal chamber to receive the DC cable assembly. The DC terminal assembly received in the terminal chamber. The terminal assembly includes a pin terminal extending from the front of the DC housing into the corresponding terminal channel, a mating end of the pin terminal presented in the receptacle for mating with the charging connector. The terminal assembly includes a terminal busbar extending from the pin terminal to the cable mount at the bottom of the DC housing for electrical connection to the DC cable assembly through the opening at the bottom of the DC housing.

In a further embodiment, a charging inlet assembly for an electric vehicle is provided and includes a charging inlet housing that has a housing front and a housing rear. The charging inlet housing has a charging receptacle at the housing front configured to receive a charging connector. The charging inlet housing includes terminal channels at the charging receptacle extending between the housing front and the housing rear. The charging inlet assembly includes a DC terminal module coupled to the charging inlet housing at the housing rear. The DC terminal module includes a DC housing holding a DC terminal assembly. The DC housing extends between a front and a rear. The DC housing has a top and a bottom. The DC housing has a housing base at the front coupled to the housing rear of the charging inlet housing. The DC housing includes walls forming a terminal chamber. The DC housing includes a cable mount at the bottom of the DC housing. The cable mount includes an opening at the bottom is open to the terminal chamber. The DC terminal assembly received in the terminal chamber. The terminal assembly includes a pin terminal extending from the front of the DC housing into the corresponding terminal channel, a mating end of the pin terminal presented in the receptacle for mating with the charging connector. The terminal assembly includes a terminal busbar extending from the pin terminal to the cable mount at the bottom of the DC housing. The charging inlet assembly includes a DC cable assembly coupled to the cable mount at the bottom of the DC housing. The DC cable assembly includes a power cable, a cable housing receiving an end of the power cable, a cable contact terminated to the end of the power cable, and a cable connector configured to electrically connect the cable contact and the terminal busbar, wherein the DC cable assembly is coupled to the cable mount at the bottom of the DC housing with the cable connector extending through the opening in the cable mount to connect to the terminal busbar in the terminal chamber.

DETAILED DESCRIPTION OF THE INVENTION

Figure 1:
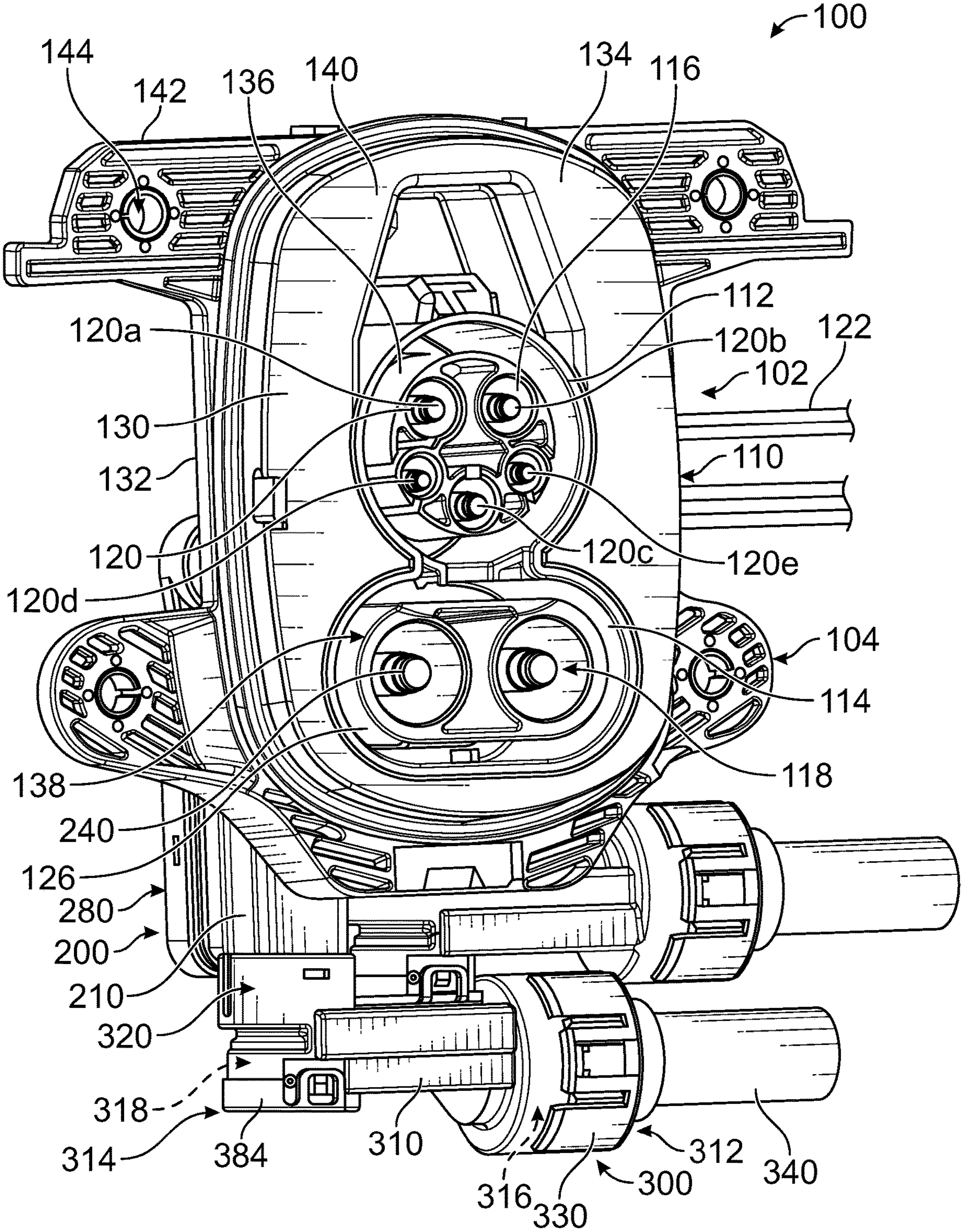
FIG. 1 is a front perspective view of a charging inlet assembly in accordance with an exemplary embodiment.
Figure 2:
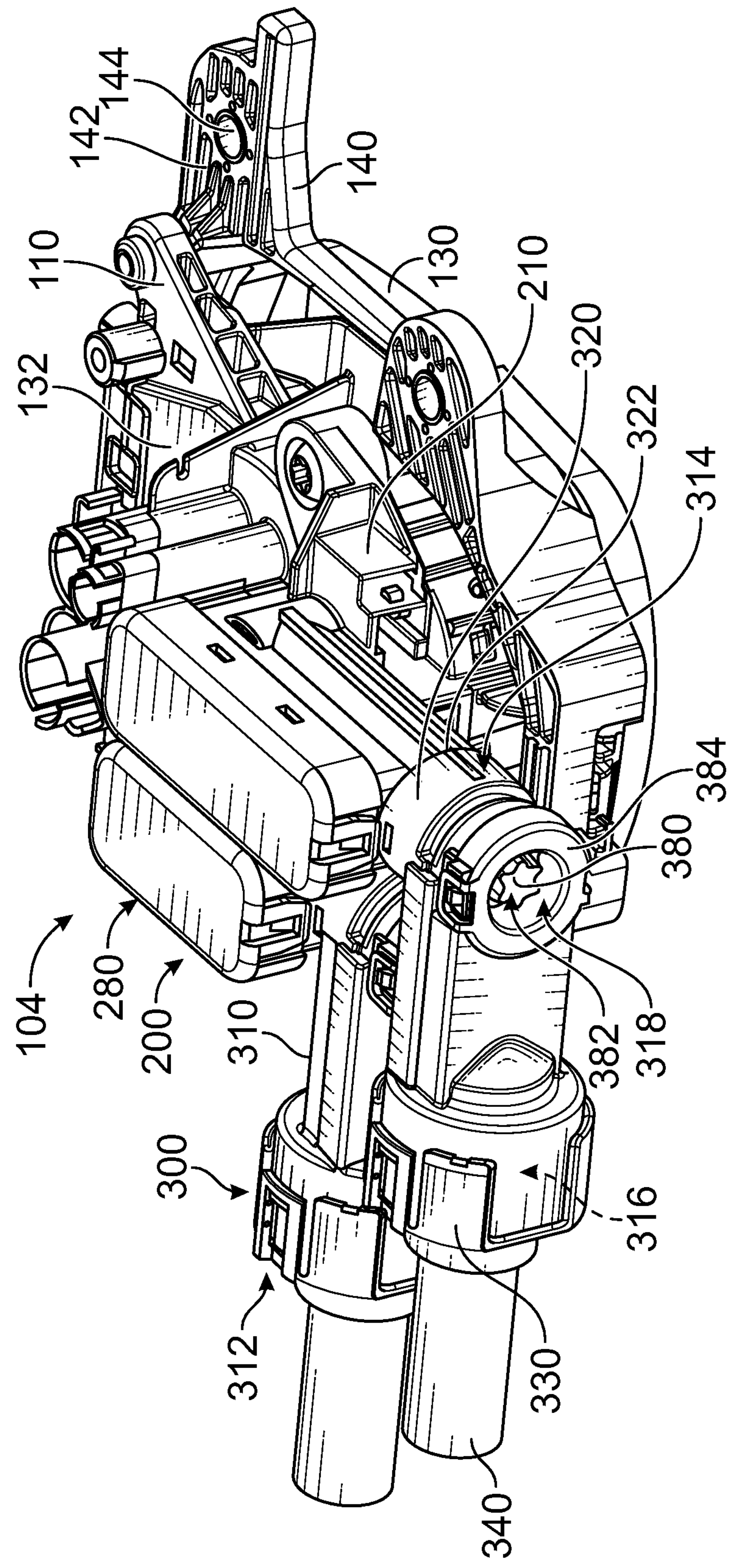
FIG. 2 is a rear perspective view of the charging inlet assembly in accordance with an exemplary embodiment.

FIG. 1 is a front perspective view of a charging inlet assembly 100 in accordance with an exemplary embodiment. FIG. 2 is a rear perspective view of the charging inlet assembly 100 in accordance with an exemplary embodiment. The charging inlet assembly 100 includes an AC charging module 102 and a DC charging module 104 in accordance with an exemplary embodiment.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 and the DC charging module 104 for mating with the charging connector. In various embodiments, components of the AC charging module 102 and/or the DC charging module 104 are removable from the housing 110. For example, the charging modules 102, 104 may be coupled to the housing 110 using latches, fasteners, clips, or other securing means. The charging modules 102, 104 may be removable from the housing 110 to separate components of the charging modules 102, 104 (for example, charging pins, cables, circuit boards, and the like) from the housing 110, such as for repair and/or replacement of the charging module components or other components of the charging inlet assembly 100.

In an exemplary embodiment, the housing 110 includes an AC section 112 that receives the AC charging module 102 and a DC section 114 that receives the DC charging module 104. The AC section 112 is configured for mating with an AC charging connector or an AC section of the charging connector. The DC section 114 is configured for mating with a DC charging connector or a DC section of the charging connector. The AC section 112 includes AC terminal channels 116. The DC section 114 includes DC terminal channels 118.

The AC charging module 102 includes AC terminals 120 at the AC section 112. The AC terminals 120 are held in the housing 110 by the AC charging module 102. The AC terminals 120 are received in corresponding AC terminal channels 116. The AC terminals 120 are configured to be mated to the charging connector. In the illustrated embodiment, five AC terminals 120 are provided, including a first AC charging terminal 120*a*, a second AC charging terminal 120*b*, a ground terminal 120*c*, a proximity terminal 120*d*, and a pilot terminal 120*e*. Optionally, the AC terminals 120 may be different sized terminals. In an exemplary embodiment, the AC terminals 120 includes pins at mating ends of the AC terminals 120. AC cables 122 are terminated to the AC terminals 120 and extend from the charging inlet assembly 100 to another component of the vehicle, such as the battery system of the vehicle. In various embodiments, the AC cables 122 may extend straight away from the AC charging module 102 and housing 110. In other various embodiments, the AC cables 122 may extend away from the AC charging module 102 and housing 110 at 900 (for example, right angle) or at other angles.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be a socket connector configured to receive the charging plug. Seals may be provided at the interface of the low-voltage connector.

The DC charging module 104 includes a DC charging port 126 at the front of the housing 110 configured for mating with the charging plug, a DC terminal module 200 at the rear of the housing 110, and a DC cable assembly 300 configured to be removable coupled to the DC terminal module 200. In an exemplary embodiment, the DC cable assembly 300 is removably coupled to the bottom of the DC terminal module 200. For example, the DC cable assembly 300 is coupled to the DC terminal module 200 at a separable mating interface at the bottom of the DC terminal module 200. Mounting the DC cable assembly 300 to the bottom of the DC terminal module 200 provides the installer with the ability to connect the DC cable(s) with no access to the back of the inlet housing 110. Such mounting provides the ability to service the DC cables without removing the charging inlet assembly 100 from the vehicle. The bottom mounting provides the ability to mount the charging inlet assembly 100 and the DC cables at different times in the vehicle assembly process. Mounting to the bottom of the charging inlet assembly 100 allows the installer to pre-assemble the charging inlet assembly 100 without the DC cables and no access to the rear of the inlet housing 110.

The DC terminal module 200 includes a DC housing 210, one or more DC terminal assemblies 240 (also referred to hereinafter as DC terminals 240) held by the DC housing 210, and one or more cover assemblies 280 coupled to the DC housing 210 to cover the DC terminal assemblies 240. The DC housing 210 is coupled to the rear of the inlet housing 110. The DC terminal assemblies 240 pass through the inlet housing 110 to the front of the inlet housing 110 at the DC charging port 126 for mating with the charging connector.

One or more of the DC cable assemblies 300 are configured to be coupled to the bottom of the DC housing 210 to connect the DC cable assemblies 300 to the DC terminal module 200. Each DC cable assembly 300 includes a DC power cable 340 configured to be electrically coupled to the corresponding DC terminal assembly 240. The DC cable assemblies 300 are removably coupled to the DC housing 210.

When assembled, the DC terminals 240 are arranged at the DC section 114. The DC terminals 240 are arranged in the housing 110 at the DC charging port 126. The DC terminals 240 are received in corresponding DC terminal channels 118. The DC terminals 240 are configured to be mated to the charging connector. In the illustrated embodiment, two DC terminals 240 are provided. In an exemplary embodiment, the DC terminals 240 include pins at mating ends of the DC terminals 240. The DC power cables 340 extend from the charging inlet assembly 100 to another component of the vehicle, such as the battery system of the vehicle. In various embodiments, the DC power cables 340 may extend away from the DC terminal module 200 at 900 (for example, right angle) or at other angles.

In an exemplary embodiment, the DC section 114 of the charging inlet assembly 100 defines a high-voltage connector configured to be coupled to the high-voltage portion of the charging connector. The high-voltage connector (for example, the DC terminals 240 and the DC power cables 340) is configured to be coupled to other components in the system, such as the battery and/or the battery distribution unit of the vehicle. The high-voltage connector is used for fast charging of the battery. The high-voltage connector may be a socket connector configured to receive the charging plug. Seals may be provided at the interface of the high-voltage connector.

The inlet housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. The housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 incudes a space around the AC terminals 120 that receives the charging connector. During charging, the AC charging connector is plugged into the AC socket 136 to electrically connect to the AC terminals 120. The DC socket 138 includes a space around the DC terminals 240 that receive the charging connector. The DC charging connector is configured to be plugged into the DC socket 138. During charging, the DC charging connector is plugged into the DC socket 138 to electrically connect to the DC terminals 240. The panel 134 may surround the AC socket 136 and the DC socket 138 at the front 130.

In an exemplary embodiment, the housing 110 includes a mounting flange 140 (FIG. 1) coupled to the panel 134 at the front 130. The mounting flange 140 includes mounting tabs 142 used for mounting the housing 110 to the vehicle. The mounting tabs 142 having openings 144 that receive fasteners (not shown) to secure the charging inlet assembly 100 to the vehicle. Other types of mounting features may be used to secure the charging inlet assembly 100 to the vehicle. The housing 110 and/or the mounting flange may include a seal to seal the charging inlet assembly 100 to the vehicle.

In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

In an exemplary embodiment, the DC cable assembly 300 includes a cable housing 310 that receives an end of the DC power cable 340, a cable contact 360 (shown in FIG. 4) terminated to the end of the DC power cable 340, and a cable connector 380 configured to electrically connect the cable contact 360 and the DC terminal assembly 240. The cable contact 360 may be soldered, welded, crimped, or otherwise terminated to the end of the power cable 340. The cable connector 380 is configured to be electrically connected to the cable contacts 360. For example, the cable connector 380 may be connected to the cable contact 360 by a compression connection. Optionally, the cable connector 380 may be threadably coupled to the cable contact 360. In other various embodiments, the cable connector 380 may be soldered or welded to the cable contact 360.

The cable housing 310 extends between a first end 312 and a second end 314. The cable housing 310 has a cable cavity 316 that receives the power cable 340 at the first end 312. In an exemplary embodiment, the cable housing 310 includes a bolt cavity 318 at the second end 314. The bolt cavity 318 is configured to receive the cable connector 380. Optionally, the bolt cavity 318 may extend generally perpendicular to the cable cavity 316. The cable contact 360 is received in the cable cavity 316 to interface with the power cable 340 and in the bolt cavity 318 to interface with the cable connector 380. In an exemplary embodiment, the cable housing 310 includes a socket 320 at the second end 314. The socket 320 is configured to be plugged onto a portion of the DC housing 210. For example, the socket 320 may be plugged onto the bottom of the DC housing 210. In alternative embodiments, the socket 320 may be plugged into the bottom of the DC housing 210. The bolt cavity 318 extends through the socket 320. The socket 320 is configured to receive the cable connector 380. In an exemplary embodiment, the cable housing 310 includes a keying feature 322 for keyed mating with the DC housing 210 to properly orient the cable housing 310 relative to the DC housing 210. The keying feature 322 may be a channel or groove formed inside the socket 320. In alternative embodiments, the keying feature 322 may include a rib, a tab, a protrusion, or other type of protruding keying feature configured to interface with a complementary keying feature of the DC housing 210. The keying feature 322 may interface with the DC housing 210 to prevent rotation of the cable housing 310 relative to the DC housing 210.

In an exemplary embodiment, the DC cable assembly 300 includes a cable cover 330 surrounding the end of the power cable 340 and coupled to the first end 312 of the cable housing 310. The cable cover 330 may be latchably coupled to the cable housing 310. In various embodiments, the cable cover 330 may hold a cable seal (not shown) configured to be sealed to the power cable 340 and/or the cable housing 310. The cable cover 330 may provide strain relief for the power cable 340 at the cable exit from the cable housing 310.

In an exemplary embodiment, the cable connector 380 includes a threaded bolt 382. The threaded bolt 382 is received in the bolt cavity 318. The head of the threaded bolt 382 is configured to be coupled to the cable contacts 360. The shaft of the threaded bolt 382 is configured to be threadably coupled to the DC terminal assembly 240. The threaded bolt 382 is used to mechanically and electrically connect the DC cable assembly 300 and the DC terminal assembly 240. The threaded bolt 382 may be tightened to provide a reliable mechanical and electrical connection therebetween. In an exemplary embodiment, the threaded bolt 382 is touch proof. For example, the threaded bolt 382 may include bolt covers at the head and/or the end of the shaft to prevent inadvertent touching of the threaded bolt 382. Handling and assembly. In an exemplary embodiment, a bolt retainer 384 is coupled to the DC housing 210 at the second end 314 to retain the threaded bolt 382 in the bolt cavity 318. The bolt retainer 384 may hold a bolt seal (not shown) configured to be sealingly coupled to the threaded bolt 382 and/or the DC housing 210.

In an exemplary embodiment, the cable connector 380 is accessible at the bottom of the DC terminal module 200. For example, the cable connector 380 may be tightened or loosened from below the DC terminal module 200 to attach or removing the DC cable assembly 300 from the bottom of the DC housing 210 the cable connector 380 is accessible without needing to access the rear of the charging inlet assembly 100, which allows attaching and removal of the DC cable assembly 300 without removing the charging inlet assembly 100 from the vehicle. As such, the charging inlet housing 110 may be coupled to the vehicle independent of the DC cable assembly 300, which allows attachment of the DC cable assembly 300 after the charging inlet housing 110 is coupled to the vehicle.

Figure 3:
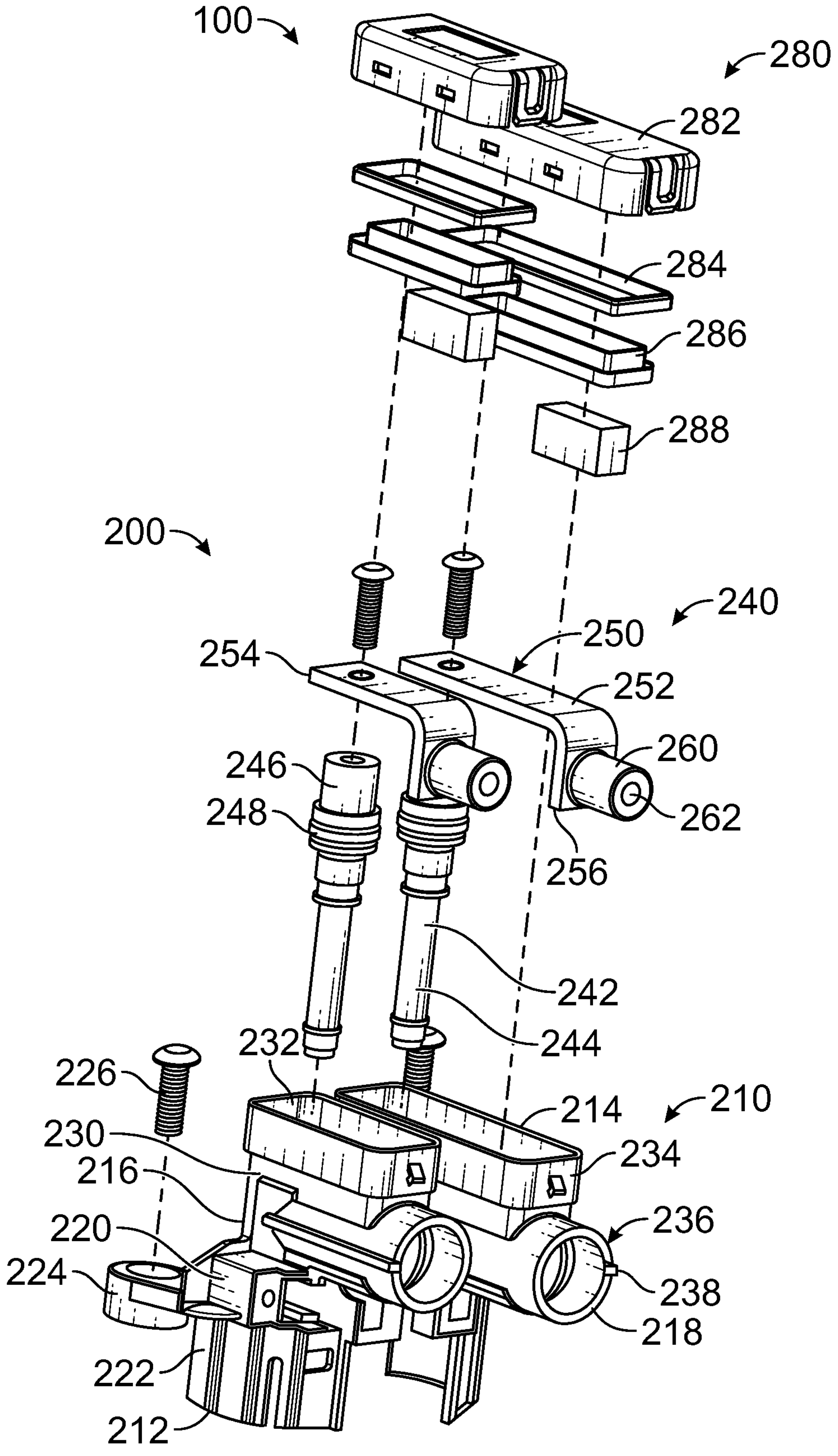
FIG. 3 is an exploded view of the DC terminal module in accordance with an exemplary embodiment.

FIG. 3 is an exploded view of the DC terminal module 200 in accordance with an exemplary embodiment. The DC terminal module 200 includes the DC housing 210, the DC terminal assemblies 240, and the cover assemblies 280. The cover assemblies 280 are used to cover the terminal assemblies 240 after the terminal assemblies 240 are loaded into the DC housing 210.

The DC housing 210 extends between a front 212 and a rear 214. The DC housing 210 includes a top 216 and a bottom 218. The DC housing 210 includes a housing base 220 at the front 212 configured to be mounted to the inlet housing 110 (shown in FIG. 2). In an exemplary embodiment, the DC housing 210 includes mounting walls 222 extending from the housing base 220 used to mount the DC housing 210 to the inlet housing 110. Optionally, the mounting walls 222 may be exposed at the front of the charging inlet assembly 100 forming a portion of the DC charging port 126 at the front of the charging inlet assembly 100. The mounting walls 222 may interface with the charging connector when the charging connector is plugged into the DC socket. In an exemplary embodiment, the DC housing 210 includes mounting brackets 224 extending from the housing base 220. The mounting brackets 224 may receive fasteners 226 to secure the DC housing 210 to the inlet housing 110.

In an exemplary embodiment, the DC housing 210 includes walls 230 forming terminal chambers 232. The terminal chambers 232 receive the corresponding DC terminals 240. The walls 230 extend rearward from the housing base 220. In an exemplary embodiment, the walls 230 form a well 234 at the rear 214 that is open at the rear 214 to receive the DC terminal assemblies 240 through the rear 214 of the DC housing 210. In the illustrated embodiment, the wells 234 are generally rectangular shaped. The wells 234 may have other shapes in alternative embodiments. The cover assemblies 280 are configured to be coupled to the walls 230 forming the wells 234 to close the openings at the rear 214. The wells 234 may include latching features to latchably secure the cover assemblies 280 to the wells 234. In an exemplary embodiment, the walls 230 form tubes 236 at the bottom 218 of the DC housing 210. The tubes 236 may be cylindrical; however, the tubes 236 may have other shapes in alternative embodiments. The tubes 236 surround portions of the terminal chambers 232. In an exemplary embodiment, the DC cable assemblies 300 are configured to be coupled to the DC housing 210 at the tubes 236. The tubes 236 may receive portions of the DC cable assemblies 300, such as the cable connectors 380. In an exemplary embodiment, the DC housing 210 includes keying features 238 along the tubes 236. The keying features 238 are configured to interface with the keying features 322 of the socket 320 of the cable housing 310 (FIG. 2) to Orient the DC cable assemblies 300 relative to the DC housing 210. In the illustrated embodiment, the keying features 238 are ribs extending along the exterior of the tubes 236. Other types of keying features may be used in alternative embodiments, such as slots or grooves.

Each DC terminal assembly 240 includes a pin terminal 242 and a terminal busbar 250. In the illustrated embodiment, the terminal busbar 250 is separate and discrete from the pin terminal 242. The pin terminal 242 is configured to be coupled to the terminal busbar 250, such as by a bolted connection, a solder connection, a welded connection, a crimp connection, or other types of mechanical connection. In the illustrated embodiment, a threaded bolt is used to connect the pin terminal 242 to the terminal busbar 250.

The pin terminal 242 includes a shaft 244 at the mating end or front of the pin terminal 242. The shaft 244 is configured to be mated with the charging connector during the charging operation. The pin terminal 242 extends along a pin axis, which is parallel to a mating direction with the charging connector. The pin terminal 242 includes a termination end 246 opposite the shaft 244. The terminal busbar 250 is configured to be connected to the termination end 246. In the illustrated embodiment, the termination end 246 includes a threaded bore that receives the threaded bolt to mechanically and electrically connect the terminal busbar 250 to the pin terminal 242. In an exemplary embodiment, the pin terminal 242 includes a terminal seal 248 configured to be sealed between the pin terminal 242 and the DC housing 210.

The terminal busbar 250 includes a plate 252 extending between a first end 254 and the second end 256. The first end 254 is configured to be coupled to the pin terminal 242, such as using the threaded the second 256 is configured to be coupled to the DC cable assembly 300 such as the cable connector 380 (for example, the threaded bolt 382). In the illustrated embodiment, the plate 252 includes a right angle bend second end 256 oriented perpendicular to the first end 254. The plate 252 may have other shapes in alternative embodiments. In an exemplary embodiment, the terminal busbar 250 includes a threaded collar 260 extending from the second end 256 of the plate 252. The threaded collar 260 may be welded to the second end 256. The threaded collar 260 includes a threaded bore 262 configured to receive the threaded bolt 382. The threaded bore 262 faces downward to receive the threaded bolt 382. In an exemplary embodiment, the threaded bore 262 extends along a bore axis oriented perpendicular to the pin access of the pin terminal 242. For example, the pin terminal 242 may be oriented horizontally and the bore axis of the threaded collar 260 may be oriented vertically.

During assembly, the DC terminal assembly 240 is configured to be loaded into the terminal chamber 232, such as through the opening at the rear 214 of the DC housing 210. Optionally, the pin terminal 242 and the terminal busbar 250 may be preassembled prior to loading the DC terminal assembly 240 into the terminal chamber 232. Alternatively, the pin terminal 242 and the terminal busbar 250 may be separately loaded into the terminal chamber 232 and coupled together once positioned within the terminal chamber 232. The pin terminal 242 is configured to pass through the housing base 220 to the front of the charging inlet assembly 100 for mating with the charging connector. The terminal busbar 250 is positioned in the terminal chamber 232 to extend into the tube 236. For example, the second end 256 of the plate 252 and/or the threaded collar 260 may be positioned in the tube 236 to interface with the cable connector 380 when the DC cable assembly 300 is coupled to the DC terminal module 200.

In an exemplary embodiment, the DC terminal assemblies 240 are sized and/or shaped differently than each other. For example, the terminal busbars 250 may be sized differently to stagger the locations of the threaded collar 260 for mating with the DC cable assemblies 300. The tubes 236 and/or the wells 234 may have different lengths to vertically stagger the mating ends of the tubes 236 to offset the locations of the DC cable assemblies 300 when mounted to the DC terminal module 200. For example, the bottom 218 of the DC housing 210 may be stepped to stagger the locations of the DC cable assemblies 300 to accommodate overlapping of the power cables 340 extending from the DC terminal module 200.

In an exemplary embodiment, the cover assembly 280 includes a lid or cover 282, a seal 284, and a seal retainer 286 used to retain the seal 284 and the cover 282. The seal 284 is configured to be sealingly coupled to the cover 282 and/or the DC housing 210. The seal retainer 286 may be snapped into the cover 282 to hold the seal 284 in position in the interior of the cover 282. The cover 282 may include latches or other securing means to secure the cover 282 to the DC housing 210. In an exemplary embodiment, the cover assembly 280 includes a heat sink 288 configured to be held by the cover 282 to interface with the DC terminal assembly 240 to dissipate heat from the DC terminal assembly 240. For example, the heat sink 288 is configured to engage the terminal busbar 250 when the cover assembly 280 is coupled to the DC housing 210.

Figure 4:
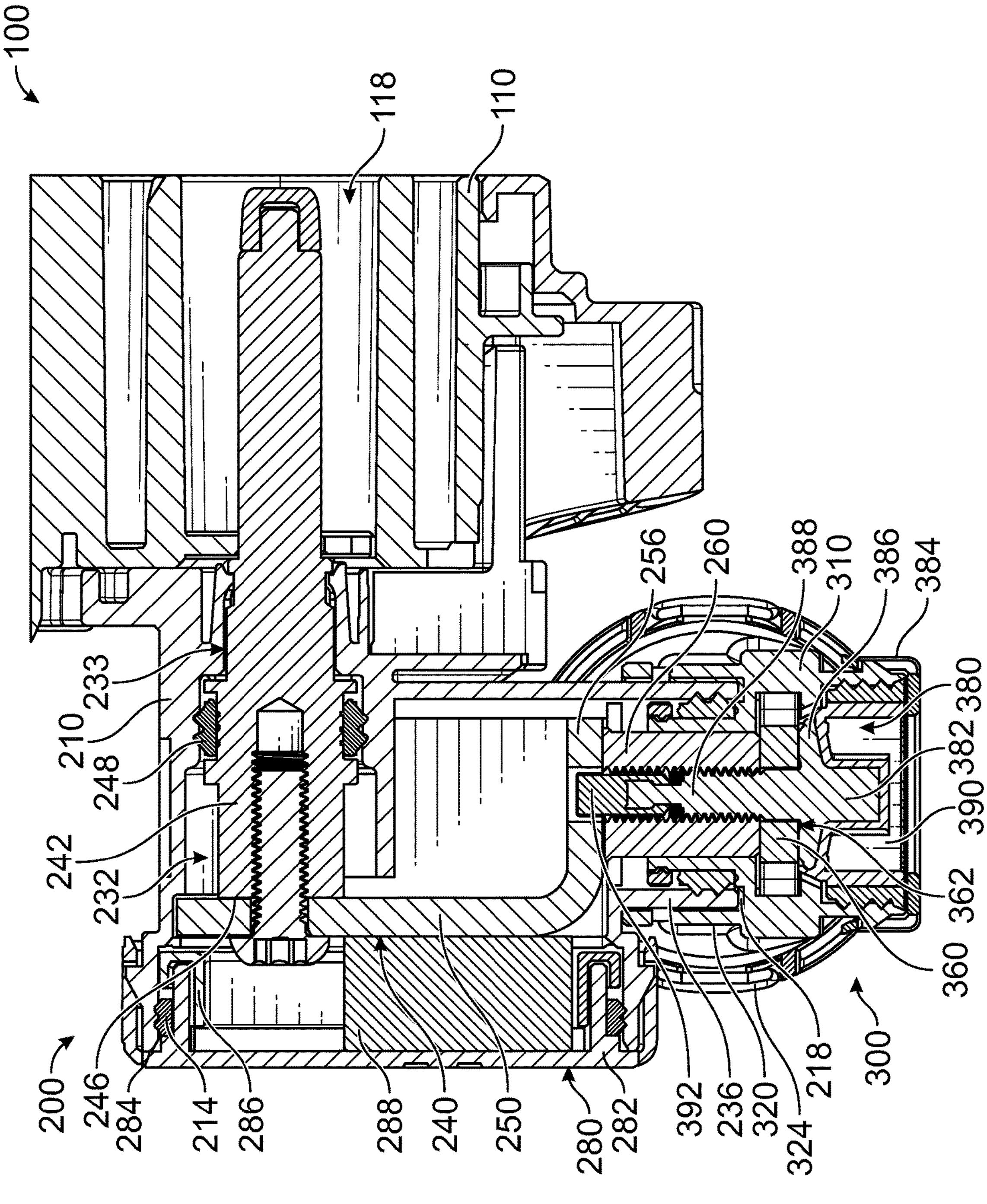
FIG. 4 is a cross-sectional view of a portion of the charging inlet assembly showing the DC terminal module coupled to the inlet housing and showing the DC cable assembly coupled to the DC terminal module in accordance with an exemplary embodiment.

FIG. 4 is a cross-sectional view of a portion of the charging inlet assembly 100 showing the DC terminal module 200 coupled to the inlet housing 110 and showing the DC cable assembly 300 coupled to the DC terminal module 200. When assembled, the DC terminal module 200 is coupled to the rear of the inlet housing 110. The DC cable assembly 300 is coupled to the bottom of the DC terminal module 200. The DC cable assembly 300 may be attached and removed from the DC terminal module 200 when there is limited or no access from behind the charging inlet assembly 100, such as when the charging inlet assembly 100 is mounted within the vehicle. Such an arrangement allows disconnection and removal of the DC cable assembly 300 from the DC terminal module 200 without removing the DC terminal module 200 and the inlet housing 110 from the vehicle.

During assembly, the DC terminal assembly 240 is received in the terminal chamber 232 of the DC housing 210. The pin terminal 242 is received in the terminal channel 118 of the inlet housing 110. For example, the pin terminal 242 is loaded into a terminal channel 233 and the DC housing 210. The terminal seal 248 of the pin terminal 242 is sealed to the interior of the DC housing 210 along the terminal channel 233. The pin terminal 242 is latchably coupled to the DC housing 210. The terminal busbar 250 is coupled to the terminating end 246 of the pin terminal 242 using the threaded bolt. The terminal busbar 250 extends downward from the pin terminal 242 in the terminal chamber 232. In an exemplary embodiment, the threaded collar 260 at the second end 256 is located in the tube 236. The threaded collar 260 faces downward from the second end 256. Optionally, the distal end of the threaded collar 260 may protrude from the bottom of the tube 236 and extend into the cable housing 310 of the DC cable assembly 300.

When assembled, the cover assembly 280 is coupled to the rear 214 of the DC housing 210. The cover seal 328 for is seal between the cover 282 and the well 234 at the rear 214 of the DC housing 210. The seal retainer 286 holds the cover seal 284 in place on the cover 282. The cover 282 may be coupled to the DC housing 210 using latches, clips, fasteners, or other securing means. In an exemplary embodiment, when the cover assembly 280 is coupled to the DC housing 210, the heat sink 288 is thermally coupled to the DC terminal assembly 240, such as to the terminal busbar 250. The heat sink 288 dissipate heat from the DC terminal assembly 240.

The DC cable assembly 300 is coupled to the bottom of the DC terminal module 200. For example, the socket 320 at the end of the cable housing 310 is coupled to the tube 236 at the bottom 218 of the DC housing 210. In an exemplary embodiment, a seal 324 is provided between the socket 320 and the tube 236 To provide a sealed interface between the DC cable assembly 300 and the DC terminal module 200. In an exemplary embodiment, the cable connector 380 is used to mechanically and electrically connect the DC cable assembly 300 to the DC terminal module 200. For example, the threaded bolt 382 passes through an opening 362 in the cable contacts 360 to interface with the DC terminal assembly 240. The threaded bolt 382 includes a head 386 and a threaded shaft 388. The threaded shaft 388 is configured to be threadably coupled to the threaded collar 260 of the terminal assembly 240. The threaded bolt 382 is tightened to press the cable contact 360 against the distal end of the threaded collar 260 and create a reliable mechanical and electrical connection between the cable contact 360 and the DC terminal assembly 240. The bolt retainer 384 covers the head 386 of the threaded bolt 382 to retain the threaded bolt 382 in the bolt cavity 318. In an exemplary embodiment, a bolt cover 390 covers the head 386 to make the cable connector 380 touch proof from the exterior of the DC cable assembly 300. In an exemplary embodiment, an insulating cap 392 is provided at the distal end of the shaft 388 of the threaded bolt 382. The insulating cap 392 protrudes from the end of the socket 320. The insulating cap 392 makes the DC cable assembly 300 touch proof during handling and assembly when the mating end of the DC cable assembly 300 is disconnected from the DC terminal module 200.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A DC terminal module for a charging inlet assembly of an electric vehicle configured to receive a charging connector to charge the electric vehicle, the DC terminal module comprising:

a DC housing having a housing base configured to be mounted to a charging inlet housing of the charging inlet assembly, the DC housing having a terminal chamber, the DC housing including a cable mount at a bottom configured to receive a DC cable assembly from the bottom of the DC housing; and a DC terminal assembly received in the terminal chamber, the DC terminal assembly including a pin terminal configured to extend from the DC housing into a receptacle of the charging inlet assembly for mating with the charging connector, the DC terminal assembly including a terminal busbar extending from the pin terminal to the cable mount at the bottom of the DC housing for electrical connection to the DC cable assembly through the bottom of the DC housing.

2. The DC terminal module of claim 1, wherein the terminal busbar includes a threaded collar at a bottom of the terminal busbar, the threaded collar configured to receive a threaded bolt to connect the DC cable assembly to the terminal busbar.

3. The DC terminal module of claim 1, wherein the terminal busbar is coupled to the pin terminal by a bolted connection.

4. The DC terminal module of claim 1, wherein the cable mount includes a separable interface configured to removably receive the DC cable assembly.

5. The DC terminal module of claim 1, wherein the pin terminal extends along a pin mating axis, the pin terminal configured to be mated to the charging connector along the pin mating axis, the cable mount configured to receive the DC cable assembly in a cable mating axis perpendicular to the pin mating axis.

6. The DC terminal module of claim 1, wherein the cable mount is located forward of a rear of the DC housing to mate with the DC cable assembly along a cable mating axis forward of the rear of the DC housing.

7. The DC terminal module of claim 1, further comprising a cover assembly coupled to a rear of the DC housing to cover the terminal chamber.

8. The DC terminal module of claim 7, wherein the cover assembly includes a seal configured to be sealed to the DC housing to seal the terminal chamber.

9. The DC terminal module of claim 7, wherein the cable assembly includes a heat sink coupled to the terminal busbar to dissipate heat from the terminal busbar.

10. The DC terminal module of claim 1, wherein the cable mount includes a locating feature configured to engage the DC cable assembly to orient the DC cable assembly relative to the cable mount.

11. A charging inlet assembly for an electric vehicle comprising:

a charging inlet housing having a housing front and a housing rear, the charging inlet housing having a charging receptacle at the housing front configured to receive a charging connector, the charging inlet housing including terminal channels at the charging receptacle extending between the housing front and the housing rear; and a DC terminal module coupled to the charging inlet housing at the housing rear, the DC terminal module including a DC housing holding a DC terminal assembly, the DC housing having a housing base coupled to the housing rear of the charging inlet housing, the DC housing including walls forming a terminal chamber, the DC housing including a cable mount at a bottom configured to receive a DC cable assembly from the bottom of the DC housing, the DC terminal assembly received in the terminal chamber, the terminal assembly including a pin terminal extending from the front of the DC housing into the corresponding terminal channel, a mating end of the pin terminal presented in the receptacle for mating with the charging connector, the terminal assembly including a terminal busbar extending from the pin terminal to the cable mount at the bottom of the DC housing for electrical connection to the DC cable assembly through the bottom of the DC housing.

12. The charging inlet assembly of claim 11, wherein the housing base forms a first separable interface being separable from the charging inlet housing, the cable mount forming a second separable interface allowing the DC cable assembly to separate from the DC terminal module independent of the connection of the DC terminal module with the charging inlet housing at the first separable interface.

13. The charging inlet assembly of claim 11, wherein the terminal busbar includes a threaded collar at a bottom of the terminal busbar, the threaded collar configured to receive a threaded bolt to connect the DC cable assembly to the terminal busbar.

14. The charging inlet assembly of claim 11, further comprising a DC cable assembly coupled to the cable mount at the bottom of the DC housing, the DC cable assembly including a power cable, a cable housing receiving an end of the power cable, a cable contact terminated to the end of the power cable, and a cable connector configured to electrically connect the cable contact and the terminal busbar, wherein the DC cable assembly is coupled to the cable mount at the bottom of the DC housing with the cable connector extending through the opening in the cable mount to connect to the terminal busbar in the terminal chamber.

15. The charging inlet assembly of claim 11, wherein the pin terminal extends along a pin mating axis, the pin terminal configured to be mated to the charging connector along the pin mating axis, the cable mount configured to receive the DC cable assembly in a cable mating axis perpendicular to the pin mating axis.

16. The charging inlet assembly of claim 11, wherein the cable mount is located forward of the rear of the DC housing to mate with the DC cable assembly along a cable mating axis forward of the rear of the DC housing.

17. A charging inlet assembly for an electric vehicle comprising:

a charging inlet housing having a housing front and a housing rear, the charging inlet housing having a charging receptacle at the housing front configured to receive a charging connector, the charging inlet housing including terminal channels at the charging receptacle extending between the housing front and the housing rear;

a DC terminal module coupled to the charging inlet housing at the housing rear, the DC terminal module including a DC housing holding a DC terminal assembly, the DC housing including a housing base coupled to the housing rear of the charging inlet housing, the DC housing including terminal chamber, the DC housing including a cable mount at a bottom of the DC housing, the DC terminal assembly received in the terminal chamber, the terminal assembly including a pin terminal extending from the front of the DC housing into the corresponding terminal channel, a mating end of the pin terminal presented in the receptacle for mating with the charging connector, the terminal assembly including a terminal busbar extending from the pin terminal to the cable mount at the bottom of the DC housing; and a DC cable assembly coupled to the cable mount at the bottom of the DC housing, the DC cable assembly including a power cable, a cable housing receiving an end of the power cable, a cable contact terminated to the end of the power cable, and a cable connector configured to electrically connect the cable contact and the terminal busbar, wherein the DC cable assembly is coupled to the cable mount at the bottom of the DC housing with the cable connector extending through the cable mount to connect to the terminal busbar in the terminal chamber.

18. The charging inlet assembly of claim 17, wherein the pin terminal extends along a pin mating axis, the pin terminal configured to be mated to the charging connector along the pin mating axis, the DC cable assembly being mated to the cable mount in a cable mating axis perpendicular to the pin mating axis.

19. The charging inlet assembly of claim 17, wherein the cable connector includes a threaded bolt being threadably coupled to a threaded collar of the terminal busbar.

20. The charging inlet assembly of claim 17, wherein the DC cable assembly includes a separable mating interface being coupled to the cable mount, the separable mating interface being touch safe.

* * * * *